United States Patent
Hu et al.

(10) Patent No.: US 9,883,442 B2
(45) Date of Patent: Jan. 30, 2018

(54) OFFLOAD PROCESSING METHOD, CONTROL UNIT, AND SYSTEM

(71) Applicant: Huawei Technologies Co., Ltd., Shenzhen (CN)

(72) Inventors: Xiaoqun Hu, Shanghai (CN); Xiaojun Ji, Shenzhen (CN); Yuhong Dai, Shenzhen (CN); Haobing Zhu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 145 days.

(21) Appl. No.: 14/793,577

(22) Filed: Jul. 7, 2015

(65) Prior Publication Data

US 2015/0312829 A1 Oct. 29, 2015

Related U.S. Application Data

(63) Continuation of application No. PCT/CN2013/070157, filed on Jan. 7, 2013.

(51) Int. Cl.
*H04W 28/08* (2009.01)
*H04W 36/22* (2009.01)
*H04W 28/16* (2009.01)
*H04W 84/12* (2009.01)

(52) U.S. Cl.
CPC .......... *H04W 36/22* (2013.01); *H04W 28/16* (2013.01); *H04W 84/12* (2013.01)

(58) Field of Classification Search
CPC ..... H04W 36/22; H04W 28/16; H04W 84/12; H04W 28/08; H04W 16/32; H04W 48/16
USPC ........................................................ 370/230
See application file for complete search history.

(56) References Cited

U.S. PATENT DOCUMENTS

| 2011/0222523 | A1 | 9/2011 | Fu et al. |
| 2011/0286437 | A1 | 11/2011 | Austin et al. |
| 2011/0320588 | A1* | 12/2011 | Raleigh ............... H04W 36/245 709/224 |

(Continued)

FOREIGN PATENT DOCUMENTS

| CN | 101754300 A | 6/2010 |
| CN | 101626596 B | 8/2011 |

(Continued)

OTHER PUBLICATIONS

Quality of Service Provisioning in 3GPP EPS, ChadChan, S. M., Akki, C. B., Journal of Telecommunication Management, Apr. 2010, vol. 3., Issue 1.*

(Continued)

*Primary Examiner* — Brandon Renner
(74) *Attorney, Agent, or Firm* — Leydig, Voit & Mayer, Ltd.

(57) ABSTRACT

A method includes: after a user equipment UE accesses a first-standard network, acquiring, by a control unit, first resource status information of the first-standard network and second resource status information of at least one second-standard network having an overlapping area with the first-standard network, where the first-standard network or the second-standard network includes a wireless fidelity WiFi network; and determining, by the control unit according to the first resource status information and the second resource status information, whether offload processing needs to be performed for the UE.

20 Claims, 4 Drawing Sheets

(56) References Cited

U.S. PATENT DOCUMENTS

| | | | | |
|---|---|---|---|---|
| 2012/0063417 A1* | 3/2012 | Redana | ............... | H04W 36/12 370/331 |
| 2013/0265879 A1* | 10/2013 | Qiang | ................. | H04W 48/18 370/235 |
| 2015/0078156 A1 | 3/2015 | Fodor et al. | | |
| 2015/0237529 A1* | 8/2015 | Nylander | ............. | H04W 28/08 370/230 |
| 2015/0282027 A1* | 10/2015 | Venkataraman | ...... | H04W 36/14 370/329 |
| 2015/0372779 A1* | 12/2015 | Lim | ..................... | H04J 11/005 370/338 |

FOREIGN PATENT DOCUMENTS

| | | |
|---|---|---|
| CN | 102440045 A | 5/2012 |
| CN | 102711184 A | 10/2012 |
| EP | 1395068 A1 | 3/2004 |
| JP | 2012511863 A | 5/2012 |
| JP | 2013530640 A | 7/2013 |
| JP | 2014514863 A | 6/2014 |
| WO | WO 2010068155 A1 | 6/2010 |
| WO | WO 2011149533 A1 | 12/2011 |
| WO | WO 2012145706 A1 | 10/2012 |

OTHER PUBLICATIONS

61620721-Specification for Patent Application 2013/0265879.*

\* cited by examiner

OFFLOAD PROCESSING METHOD, CONTROL UNIT, AND SYSTEM

CROSS-REFERENCE TO RELATED APPLICATIONS

This application is a continuation of International Application No. PCT/CN2013/070157, filed on Jan. 7, 2013, which is hereby incorporated by reference in its entirety.

TECHNICAL FIELD

Embodiments of the present invention relate to a communications technology, and in particular, to an offload processing method, a control unit, and a system.

BACKGROUND

With the large-scale application of mobile intelligent terminals and increasing demands on wireless communication bandwidth, new communication standards and networking forms are gradually introduced in the field of wireless communications, and a parallel operation situation of multi-standard and macro/micro cell multi-layer networks, such as a global system for mobile communications (global system for mobile communications, GSM for short), a universal mobile telecommunications system (Universal Mobile Telecommunications System, UMTS for short), and a long time evolution system (Long Time Evolution, LTE for short), is formed by more and more operators.

In the prior art, users may be handed over between network systems such as the GSM, UMTS, and LTE to optimize performance of the network systems, and improve quality of service for the users.

However, a problem that requirements of users on radio resources cannot be met still exists in the prior art, and especially in some hot spots, the problem is more obvious.

SUMMARY

Embodiments of the present invention provide an offload processing method, a control unit, and a system, which are used to provide a user with more wireless network resources, optimize the configuration of wireless network resources, and further improve utilization of wireless network resources.

A first aspect of the present invention provides an offload processing method, including:

after a user equipment UE accesses a first-standard network, acquiring, by a control unit, first resource status information of the first-standard network and second resource status information of at least one second-standard network having an overlapping area with the first-standard network, where the first-standard network or the second-standard network includes a wireless fidelity Wi-Fi network; and determining, by the control unit according to the first resource status information and the second resource status information, whether offload processing needs to be performed for the UE.

In a first possible implementation manner of the first aspect, the acquiring, by a control unit, second resource status information of at least one second-standard network having an overlapping area with the first-standard network, includes:

determining, by the control unit, a location of the UE; and acquiring, by the control unit, second resource status information of at least one second-standard network, which has an overlapping area with the first-standard network, at the location of the UE.

With reference to the first aspect, in a second possible implementation manner of the first aspect, the acquiring, by a control unit, second resource status information of at least one second-standard network having an overlapping area with the first-standard network, includes:

determining, by the control unit, a network support capability of the UE; and acquiring, by the control unit, second resource status information of at least one second-standard network having an overlapping area with the first-standard network and supported by the network support capability of the UE.

With reference to the first aspect or either one of the first or second possible implementation manner of the first aspect, in a third possible implementation manner of the first aspect, the determining, by the control unit according to the first resource status information and the second resource status information, whether offload processing needs to be performed for the UE, includes:

determining, by the control unit, a residual capacity of the first-standard network according to the first resource status information; and if determining, according to the second resource status information, that a residual capacity of a first network in the at least one second-standard network is greater than the residual capacity of the first-standard network, offloading, by the control unit, the UE to the first network.

According to the third possible implementation manner of the first aspect, in a fourth possible implementation manner of the first aspect, if there are two or more first networks in the at least one second-standard network, the offloading, by the control unit, the UE to the first network, includes:

acquiring, by the control unit, service type information of a service required by the UE; and offloading, by the control unit, the UE to a first network meeting the service type information.

According to the fourth possible implementation manner of the first aspect, in a fifth possible implementation manner of the first aspect, the service type information of the UE includes any one or a combination of browse, interaction, and download.

With reference to the first aspect or any one of the first to fifth possible implementation manners of the first aspect, in a sixth possible implementation manner of the first aspect, the acquiring, by a control unit, first resource status information of the first-standard network and second resource status information of at least one second-standard network having an overlapping area with the first-standard network, includes:

querying and acquiring, by the control unit, resource status information of the WiFi network from a controller of the WiFi network.

With reference to the first aspect or any one of the first to fifth possible implementation manners of the first aspect, in a seventh possible implementation manner of the first aspect, the resource status information includes:

at least one piece of information in network deployment information, load information, the number of users, and average bandwidth that each user can acquire.

With reference to the first aspect or any one of the first to seventh possible implementation manners of the first aspect, in an eighth possible implementation manner of the first aspect, the first-standard network and the second-standard network are a global system for mobile communications GSM network, a universal mobile telecommunications system UMTS network, a long time evolution LTE network, and a WiFi network, and the first-standard network and the second-standard network are different.

A second aspect of the present invention provides a control unit, including:

an acquiring module, configured to acquire, after a user equipment UE accesses a first-standard network, first resource status information of the first-standard network and second resource status information of at least one second-standard network having an overlapping area with the first-standard network, where the first-standard network or the second-standard network includes a wireless fidelity WiFi network; and a processing module, configured to determine, according to the first resource status information and the second resource status information, whether offload processing needs to be performed for the UE.

In a first possible implementation manner of the second aspect, the acquiring module is specifically configured to:

determine a location of the UE; and acquire second resource status information of at least one second-standard network, which has an overlapping area with the first-standard network, at the location of the UE.

With reference to the second aspect, in a second possible implementation manner of the second aspect, the acquiring module is specifically configured to:

determine a network support capability of the UE; and acquire second resource status information of at least one second-standard network having an overlapping area with the first-standard network and supported by the network support capability of the UE.

With reference to the second aspect or either one of the first or second possible implementation manner of the second aspect, in a third possible implementation manner of the second aspect, the processing module is specifically configured to:

determine a residual capacity of the first-standard network according to the first resource status information; and if determining, according to the second resource status information, that a residual capacity of a first network in the at least one second-standard network is greater than the residual capacity of the first-standard network, offload the UE to the first network.

According to the third possible implementation manner of the second aspect, in a fourth possible implementation manner of the second aspect, the processing module is further configured to:

if there are two or more first networks in the at least one second-standard network, acquire service type information of a service required by the UE; and offload the UE to a first network meeting the service type information.

According to the fourth possible implementation manner of the second aspect, in a fifth possible implementation manner of the second aspect, the service type information of the UE includes any one or a combination of browse, interaction, and download.

With reference to the second aspect or any one of the first to fifth possible implementation manners of the second aspect, in a sixth possible implementation manner of the second aspect, the acquiring module is further configured to query and acquire resource status information of the WiFi network from a controller of the WiFi network.

With reference to the second aspect or any one of the first to fifth possible implementation manners of the second aspect, in a seventh possible implementation manner of the second aspect, the resource status information includes:

at least one piece of information in network deployment information, load information, the number of users, and average bandwidth that each user can acquire.

With reference to the second aspect or any one of the first to seventh possible implementation manners of the second aspect, in an eighth possible implementation manner of the second aspect, the first-standard network and the second-standard network are a global system for mobile communications GSM network, a universal mobile telecommunications system UMTS network, a long time evolution LTE network, and a WiFi network, and the first-standard network and the second-standard network are different.

A third aspect of the present invention provides a control unit, including: a processor, a memory, and a network interface, where: the memory stores an execution instruction; when the control unit runs, the processor communicates with the memory; the processor is connected to the network interface; the network interface includes a network interface for communication with a WiFi network and other networks than the WiFi network; and the processor executes the execution instruction, so that the control unit executes the method according to the first aspect or any one of the possible implementation manners of the first aspect.

A fourth aspect of the present invention provides a computer readable medium, including a computer execution instruction, where the computer execution instruction is used to cause a control unit to execute the method according to the first aspect or any one of the possible implementation manners of the first aspect.

A fifth aspect of the present invention provides a system, including: the control unit according to the second aspect, any one of the possible implementation manners of the second aspect, or any one of the possible implementation manners of the third aspect, a controller of a WiFi network, and controllers of other networks than the WiFi network, where each controller communicates with the control unit through the network interface on the control unit.

According to the offload processing method, the control unit, and the system provided by the embodiments of the present invention, after a user equipment UE accesses a first-standard network, the control unit acquires first resource status information of the first-standard network and second resource status information of at least one second-standard network having an overlapping area with the first-standard network, where the first-standard network or the second-standard network includes a WiFi network; and then the control unit determines, according to the first resource status information and the second resource status information, whether offload processing needs to be performed for the UE. In this way, a user can be provided with more wireless network resources, the configuration of wireless network resources can be optimized, and further, utilization of wireless network resources can be improved.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention more comprehensible, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Figure 1:
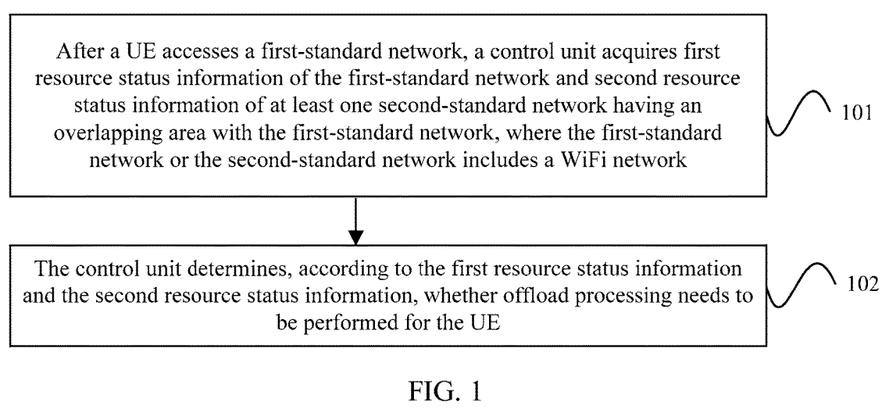
FIG. 1 is a flowchart of Embodiment 1 of an offload processing method according to the present invention.

FIG. 1 is a flowchart of Embodiment 1 of an offload processing method according to the present invention. As shown in FIG. 1, the offload processing method according to this embodiment includes:

S101. After a UE accesses a first-standard network, a control unit acquires first resource status information of the first-standard network and second resource status information of at least one second-standard network having an overlapping area with the first-standard network, where the first-standard network or the second-standard network includes a WiFi network.

Specifically, after a user equipment (User Equipment, UE for short) accesses a first-standard network, a control unit may acquire, through a network interface between the control unit and a controller of each network, first resource status information of the first-standard network of a serving cell in which the UE is located and second resource status information of at least one second-standard network having an overlapping area with the first-standard network, where the at least one second-standard network having an overlapping area with the first-standard network may be at least one second-standard network corresponding to a serving cell having the same coverage as the serving cell in which the UE is located, and the first-standard network or the second-standard network includes a wireless fidelity (Wireless Fidelity, WiFi for short) network. In this embodiment, the control unit and the controller of the WiFi network may be connected in a wireless manner, and may also be connected in a wired manner.

Optionally, the first resource status information and the second resource status information may include at least one piece of information in network deployment information, load information, the number of users, and average bandwidth that each user can acquire.

Optionally, the first-standard network and the second-standard network may be a global system for mobile communications GSM network, a universal mobile telecommunications system UMTS network, a long time evolution LTE network, and a WiFi network, and the first-standard network and the second-standard network are different.

The first resource status information and the second resource status information may reflect a residual capacity or pipeline capacity of the first-standard network and the at least one second-standard network.

Further, a manner of acquiring, by the control unit, resource status information of the WiFi network may be: querying and acquiring, by the control unit, the resource status information from the controller of the WiFi network.

Specifically, the control unit may query for the resource status information of the WiFi network from the controller of the WiFi network through a network interface between the control unit and the WiFi network, and store the resource status information of the WiFi network to the control unit, and after the UE accesses the first-standard network, read the resource status information of the WiFi network, where the network interface between the control unit and the controller of the WiFi network may be a bidirectional interface for bearing the resource status information of the WiFi network and control indication information of the control unit for the WiFi network, which is a new interface defined for implementing the offload processing method according to the present invention; and the interface may be a hardware interface, and may also be a software interface.

S102. The control unit determines, according to the first resource status information and the second resource status information, whether offload processing needs to be performed for the UE.

Specifically, the control unit may determine, according to the first resource status information and the second resource status information, the residual capacity of the serving cell in which the UE is located and the residual capacity of the serving cell having the same coverage as the serving cell in which the UE is located, and by comparing the residual capacities of the serving cells, for example, if the residual capacity of the first-standard network is less than a residual capacity of a first network in the at least one second-standard network, determine that offload processing needs to be performed for the UE, where the first network may include one network or at least two networks. Using a multi-standard and multi-layer network system including GSM, UMTS, LTE, and a WiFi network as an example, the performing offload processing for the UE may include various manners of offload processing such as handing over the UE from GSM network to LTE network, handing over the UE from UMTS to LTE, offloading the UE from UMTS to the WiFi network, and offloading the UE from LTE to the WiFi network.

For the multi-standard and multi-layer network system, the control unit is set to firstly acquire first resource status information of the first-standard network and second resource status information of at least one second-standard network having an overlapping area with the first-standard network, and then determine, according to the first resource status information and the second resource status information, whether offload processing needs to be performed for the UE. The introduction of the WiFi network may further improve the residual capacity or pipeline capacity of the multi-standard and multi-layer network system, thereby better meeting requirements of a user on radio resources, optimizing the configuration of wireless network resources, and further improving utilization of wireless network resources.

According to the offload processing method provided by this embodiment, after a user equipment UE accesses a first-standard network, a control unit acquires first resource status information of the first-standard network and second resource status information of at least one second-standard network having an overlapping area with the first-standard network, where the first-standard network or the second-standard network includes a WiFi network; and then the control unit determines, according to the first resource status information and the second resource status information, whether offload processing needs to be performed for the UE. In this way, a user can be provided with more wireless network resources, the configuration of wireless network resources can be optimized, and further, utilization of wireless network resources can be improved.

Figure 2:
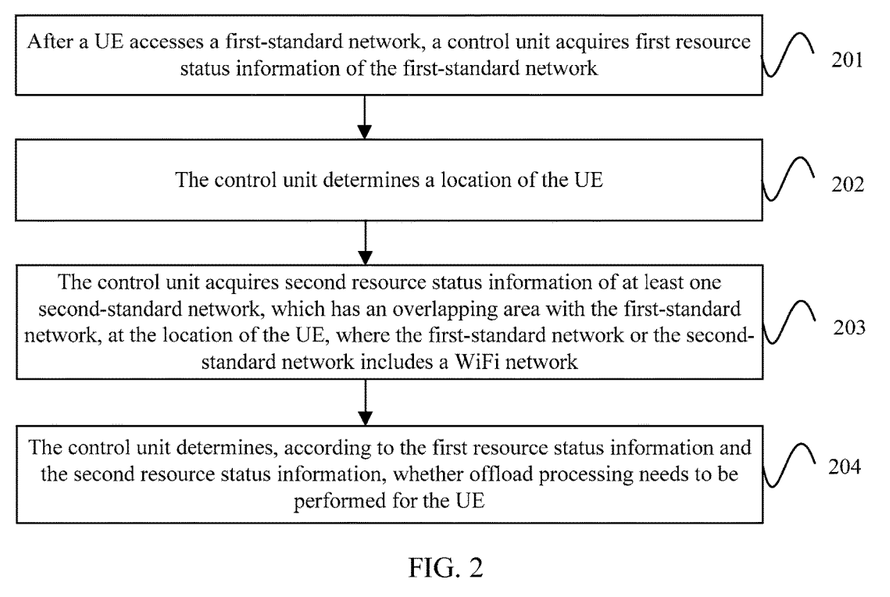
FIG. 2 is a flowchart of Embodiment 2 of an offload processing method according to the present invention.

FIG. 2 is a flowchart of Embodiment 2 of an offload processing method according to the present invention. As shown in FIG. 2, the difference between this embodiment and the embodiment shown in FIG. 1 is as follows: The at least one second-standard network in the embodiment shown in FIG. 1 is determined based on the serving cell in which the UE is located, but because it is possible that network standards at different locations within the coverage of a same serving cell are different, the at least one second-standard network is determined based on a specific location of the UE in the embodiment shown in FIG. 2, so that the offload processing is more accurate. The offload processing method according to this embodiment, based on the embodiment shown in FIG. 1, includes:

S201. After a UE accesses a first-standard network, a control unit acquires first resource status information of the first-standard network.

S202. The control unit determines a location of the UE.

Specifically, network standards at different locations within the coverage of a same serving cell are the same theoretically, but due to some objective factors, such as a factor of blockage by buildings, it is possible that network standards at different locations within the coverage of the same serving cell are different. Therefore, the acquiring, by the control unit, second resource status information of at least one second-standard network, which has an overlapping area with the first-standard network, at the location of the UE, may reduce the wrong determination of the control unit on offload processing of the UE, and improve accuracy of determining a target-standard network by the control unit.

A manner of determining the location of the UE may be: determining, by the control unit, the location of the UE indirectly or directly according to information such as measurement reports reported by the UE or mobile data terminal (Mobile Data Terminal, MDT for short) data.

S203. The control unit acquires second resource status information of at least one second-standard network, which has an overlapping area with the first-standard network, at the location of the UE, where the first-standard network or the second-standard network includes a WiFi network.

Specifically, the control unit may determine, according to the location of the UE, the network standard at the location of the UE, and then acquire second resource status information of at least one second-standard network, which has an overlapping area with the first-standard network, at the location of the UE.

S204. The control unit determines, according to the first resource status information and the second resource status information, whether offload processing needs to be performed for the UE.

According to the offload processing method provided by this embodiment, after a UE accesses a first-standard network, a control unit acquires first resource status information of the first-standard network, determines a location of the UE, and acquires second resource status information of at least one second-standard network, which has an overlapping area with the first-standard network, at the location of the UE, where the first-standard network or the second-standard network includes a WiFi network; and then the control unit determines, according to the first resource status information and the second resource status information, whether offload processing needs to be performed for the UE. In this way, a user can be provided with more wireless network resources, the configuration of wireless network resources can be further optimized according to a location of the UE, and further, utilization of wireless network resources can be improved.

Figure 3:
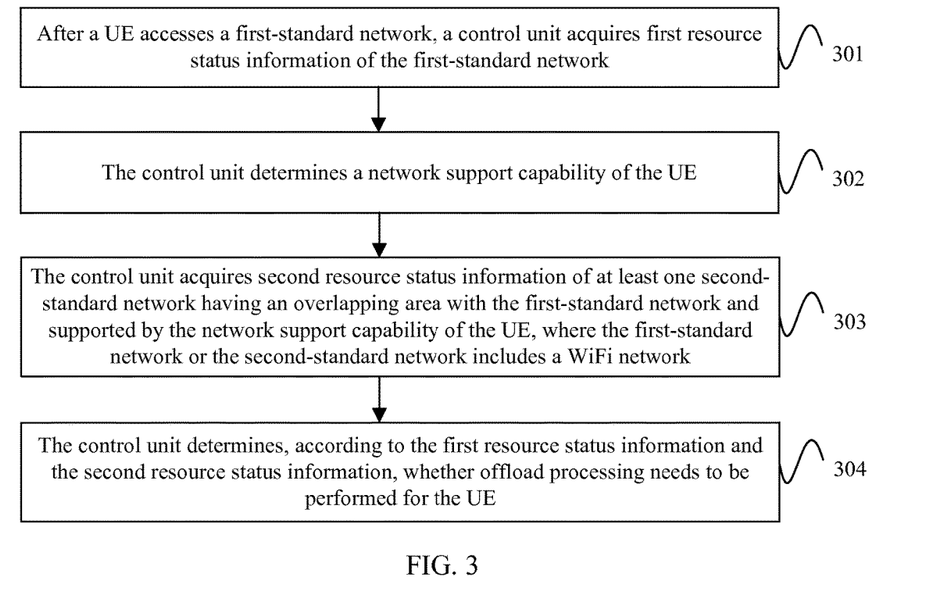
FIG. 3 is a flowchart of Embodiment 3 of an offload processing method according to the present invention.

FIG. 3 is a flowchart of Embodiment 3 of an offload processing method according to the present invention. As shown in FIG. 3, a network support capability of a UE is further considered in this embodiment. Because network standards supported by different UEs are different, determining at least one second-standard network according to the network support capability of the UE may further ensure accuracy of offload processing. The offload processing method according to this embodiment, based on the embodiment shown in FIG. 1, includes:

S301. After a UE accesses a first-standard network, a control unit acquires first resource status information of the first-standard network.

S302. The control unit determines a network support capability of the UE.

Specifically, network standards that can be supported by different UEs are different. For example, some UEs can support GSM and UMTS, but cannot support a WiFi network; therefore, even if the residual capacity of the WiFi network in a current multi-standard and multilayer network system is maximum, the UE cannot be offloaded to the WiFi network, and the control unit does not need to acquire the resource status information of the WiFi network.

S303. The control unit acquires second resource status information of at least one second-standard network having an overlapping area with the first-standard network and supported by the network support capability of the UE, where the first-standard network or the second-standard network includes a WiFi network.

Specifically, the acquiring, by the control unit, second resource status information of at least one second-standard network having an overlapping area with the first-standard network and supported by the network support capability of the UE, may reduce the wrong determination of the control unit on offload processing of the UE, and improve accuracy of determining a target-standard network by the control unit.

S304. The control unit determines, according to the first resource status information and the second resource status information, whether offload processing needs to be performed for the UE.

According to the offload processing method provided by this embodiment, after a UE accesses a first-standard network, a control unit acquires first resource status information of the first-standard network, determines a network support capability of the UE, and acquires second resource status information of at least one second-standard network having an overlapping area with the first-standard network and supported by the network support capability of the UE, where the first-standard network or the second-standard network includes a WiFi network; and then the control unit determines, according to the first resource status information and the second resource status information, whether offload processing needs to be performed for the UE. In this way, a user can be provided with more wireless network resources, the configuration of wireless network resources can be further optimized according to the network support capability of the UE, and further, utilization of wireless network resources can be improved.

Understandably, with reference to the embodiments shown in FIG. 2 and FIG. 3, the control unit may further determine the location of the UE and the network support capability of the UE, and then acquire second resource status information of at least one second-standard network having an overlapping area with the first-standard network and supported by the network support capability of the UE, at the location of the UE, where the first-standard network or the second-standard network includes a WiFi network, so that in the offload processing method provided by this embodiment, the second resource status information can be acquired more accurately according to the location of the UE and the network support capability of the UE, thereby further ensuring that the offload processing method provided by this embodiment is more accurate.

Figure 4:
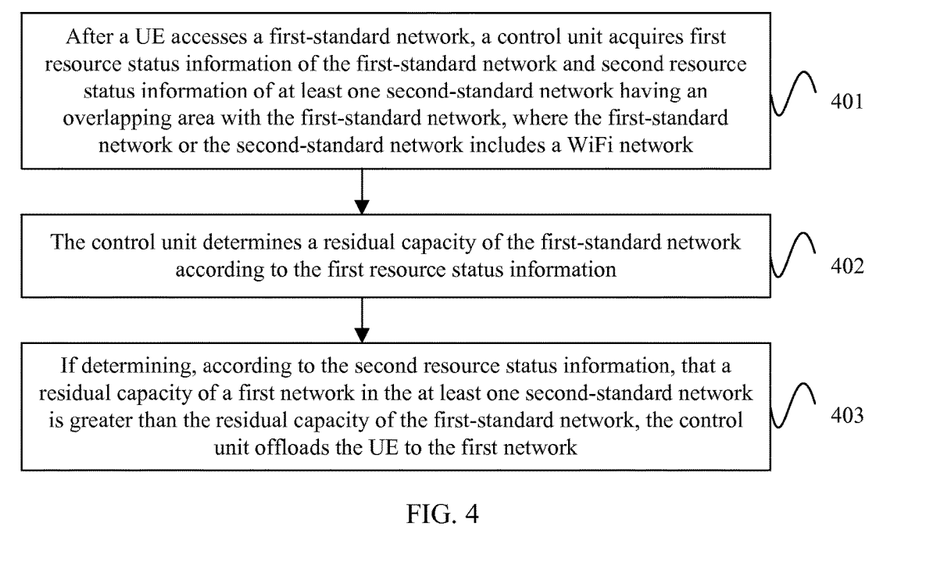
FIG. 4 is a flowchart of Embodiment 4 of an offload processing method according to the present invention.

FIG. 4 is a flowchart of Embodiment 4 of an offload processing method according to the present invention. As shown in FIG. 4, in this embodiment, whether offload processing needs to be performed for a UE is determined specifically on the basis of comparing residual capacities of networks of standards. The offload processing method according to this embodiment, based on the embodiment shown in FIG. 1, includes:

S401. After a UE accesses a first-standard network, a control unit acquires first resource status information of the first-standard network and second resource status information of at least one second-standard network having an overlapping area with the first-standard network, where the first-standard network or the second-standard network includes a WiFi network.

S402. The control unit determines a residual capacity of the first-standard network according to the first resource status information.

Specifically, the first resource status information may include at least one piece of information in network deployment information, load information, the number of users, and average bandwidth that each user can acquire, of the first-standard network in which the UE is located, and the first resource status information may reflect the residual capacity or pipeline capacity of the first-standard network.

S403. If determining, according to the second resource status information, that a residual capacity of a first network in the at least one second-standard network is greater than the residual capacity of the first-standard network, the control unit offloads the UE to the first network.

Specifically, if the residual capacity of the first network in the at least one second-standard network is greater than the residual capacity of the first-standard network, the first network may provide a more efficient service for the UE, and offloading the UE to the first network may meet requirements of a user on radio resources better.

Understandably, if determining, according to the second resource status information, that a residual capacity of a network in the at least one second-standard network is greater than the residual capacity of the first-standard network, the control unit offloads the UE to the network whose residual capacity is greater than the residual capacity of the first-standard network, in the at least one second-standard network, so that the requirements of the user on radio resources may be met better.

According to the offload processing method provided by this embodiment, after a UE accesses a first-standard network, a control unit acquires first resource status information of the first-standard network and second resource status information of at least one second-standard network having an overlapping area with the first-standard network, where the first-standard network or the second-standard network includes a WiFi network; and then, the control unit determines a residual capacity of the first-standard network according to the first resource status information; and if determining, according to the second resource status information, that a residual capacity of a first network in the at least one second-standard network is greater than the residual capacity of the first-standard network, the control unit offloads the UE to the first network. In this way, a user can be provided with more wireless network resources, the configuration of wireless network resources can be further optimized according to the network support capability of the UE, and further, utilization of wireless network resources can be improved.

Figure 5:
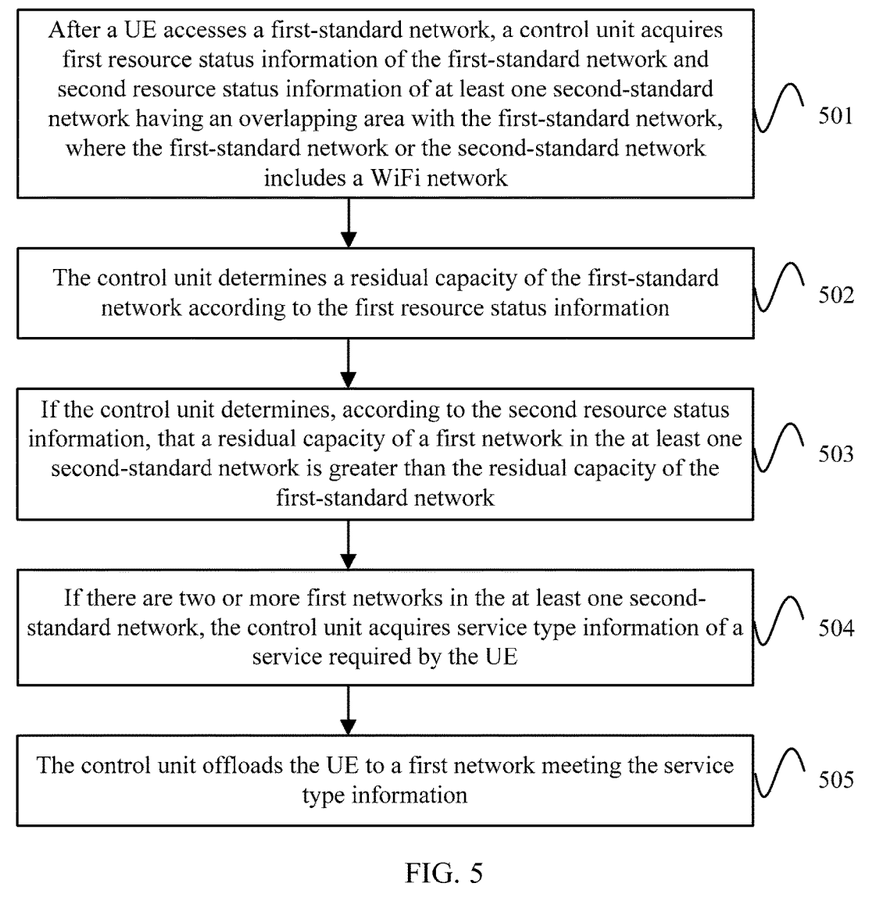
FIG. 5 is a flowchart of Embodiment 5 of an offload processing method according to the present invention.

FIG. 5 is a flowchart of Embodiment 5 of an offload processing method according to the present invention. As shown in FIG. 5, in this embodiment, in a scenario where in at least one second-standard network, there are two or more networks whose residual capacity is greater than a residual capacity of a first-standard network, an offload processing method using service type information of a UE as a selection basis is provided. The offload processing method according to this embodiment, based on the embodiment shown in FIG. 4, includes:

S501. After a UE accesses a first-standard network, a control unit acquires first resource status information of the first-standard network and second resource status information of at least one second-standard network having an overlapping area with the first-standard network, where the first-standard network or the second-standard network includes a WiFi network.

S502. The control unit determines a residual capacity of the first-standard network according to the first resource status information.

S503. If the control unit determines, according to the second resource status information, that a residual capacity of a first network in the at least one second-standard network is greater than the residual capacity of the first-standard network, execute step S504.

S504. If there are two or more first networks in the at least one second-standard network, the control unit acquires service type information of a service required by the UE.

Optionally, the service type information of the UE includes any one or a combination of browse, interaction, and download.

Specifically, if there are two or more first networks in the at least one second-standard network, the control unit needs to select to offload the UE to one network in the at least two first networks, and the control unit may select one network in the at least two first networks according to the service type information of the service required by the UE. For example, if the service type information of the UE is download, the residual capacity required by the UE is large, and the UE is offloaded to one network having a large residual capacity, in the at least two first networks.

Understandably, in some scenarios, the service type information of the UE may also be used as a basis for determining whether to perform offload processing for the UE. For example, the residual capacity of the first-standard network in which the UE is located is less than the residual capacity of the first network in the at least one second-standard network, but the current service type information of the UE is interaction, the required residual capacity is small, and the residual capacity of the first-standard network can meet the requirement of the UE for performing normal interaction; in this case, offload processing may not be performed for the UE, and the first-standard network still provides a service for the UE.

S505. The control unit offloads the UE to a first network meeting the service type information.

According to the offload processing method provided by this embodiment, in a scenario where there are two or more first networks in at least one second-standard network, service type information of a service required by a UE is acquired, and the UE is offloaded to a first network meeting the service type information. In this way, the UE can be offloaded to a most suitable network, the configuration of wireless network resources can be optimized, and further, utilization of wireless network resources can be improved.

A control unit for executing the foregoing method embodiments is hereinafter described in detail. The control unit in the following embodiments may be a super network element named eCoordinator and used for connecting a radio network controller (Radio Network Controller, RNC for short), and/or a base station controller (Base Station Controller, BSC for short), and/or a base station (evolved NodeB, eNB for short below), and/or a controller of WiFi network (WiFi Access Controller, WiFi AC for short), and/or other wireless standard network elements.

Figure 6:
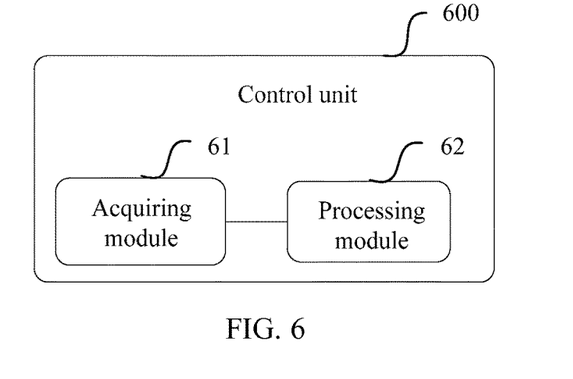
FIG. 6 is a schematic structural diagram of Embodiment 1 of a control unit according to the present invention.

FIG. 6 is a schematic structural diagram of Embodiment 1 of a control unit according to the present invention. As shown in FIG. 6, a control unit 600 in this embodiment includes an acquiring module 61 and a processing module 62. The acquiring module 61 is configured to acquire, after a user equipment UE accesses a first-standard network, first resource status information of the first-standard network and second resource status information of at least one second-standard network having an overlapping area with the first-standard network, where the first-standard network or the second-standard network includes a wireless fidelity WiFi network. The processing module 62 is configured to determine, according to the first resource status information and the second resource status information, whether offload processing needs to be performed for the UE.

Optionally, the acquiring module 61 is further configured to query and acquire resource status information of the WiFi network from a controller of the WiFi network.

The control unit 600 provided by the embodiment and the controller of the WiFi network may be connected in a wireless manner, and may also be connected in a wired manner, and a network interface for querying and acquiring resource status information of the WiFi network from the controller of the WiFi network may be a bidirectional interface for bearing the resource status information of the WiFi network and control indication information of the control unit for the WiFi network, which is a new interface defined for implementing the offload processing method according to the present invention; and the interface may be a hardware interface, and may also be a software interface.

Optionally, the resource status information may include at least one piece of information in network deployment information, load information, the number of users, and average bandwidth that each user can acquire.

Optionally, the first-standard network and the second-standard network are a GSM network, a UMTS network, an LTE network, and a WiFi network, and the first-standard network and the second-standard network are different.

In a hardware implementation, the acquiring module 61 may be a transmitter or a transceiver. The processing module 62 may be embedded in or independent of a processor of the control unit in a hardware form, and may also be stored in a memory of the control unit in a software form so that the processor invokes and executes corresponding operations of each module. The processor may be a central processing unit (CPU), a microprocessor, a single-chip microcomputer, or the like.

Specifically, after a UE accesses a first-standard network, the control unit provided by this embodiment may acquire, through a network interface between the control unit and each network, first resource status information of a first-standard network of a serving cell in which the UE is located and second resource status information of at least one second-standard network having an overlapping area with the first-standard network, where the at least one second-standard network having an overlapping area with the first-standard network may be at least one second-standard network corresponding to a serving cell having the same coverage as the serving cell in which the UE is located, and the first-standard network or the second-standard network includes a wireless fidelity WiFi network.

The apparatus provided by this embodiment may be used for executing the technical solution of the method embodiment shown in FIG. 1. The implementation principles and technical effects thereof are similar, and are not repeated herein.

Further, based on the embodiment shown in FIG. 6, in Embodiment 2 of the control unit according to the present invention, at least one second-standard network is determined based on a specific location of the UE. The acquiring module 61 is specifically configured to:

determine a location of the UE; and acquire second resource status information of at least one second-standard network, which has an overlapping area with the first-standard network, at the location of the UE.

Specifically, network standards at different locations within the coverage of a same serving cell are the same theoretically, but due to some objective factors, such as a factor of blockage by buildings, it is possible that network standards at different locations within the coverage of the same serving cell are different. Therefore, the acquiring, by the control unit, second resource status information of at least one second-standard network, which has an overlapping area with the first-standard network, at the location of the UE, may reduce the wrong determination of the control unit on offload processing of the UE, and improve accuracy of determining a target-standard network by the control unit.

A manner of determining the location of the UE may be: determining, by the control unit, the location of the UE indirectly or directly according to information such as measurement reports reported by the UE or MDT data.

The apparatus provided by this embodiment may be used for executing the technical solution of the method embodiment shown in FIG. 2. The implementation principles and technical effects thereof are similar, and are not repeated herein.

Further, based on the embodiment shown in FIG. 6, in Embodiment 3 of the control unit according to the present invention, a network support capability of the UE is further considered. Because network standards supported by different UEs are different, at least one second-standard network is determined according to the network support capability of the UE. The acquiring module 61 is specifically configured to:

determine the network support capability of the UE; and acquire second resource status information of at least one second-standard network having an overlapping area with the first-standard network and supported by the network support capability of the UE.

Specifically, the acquiring, by the control unit, second resource status information of at least one second-standard network having an overlapping area with the first-standard network and supported by the network support capability of the UE, may reduce the wrong determination of the control unit on offload processing of the UE, and improve accuracy of determining a target-standard network by the control unit.

The apparatus provided by this embodiment may be used for executing the technical solution of the method embodiment shown in FIG. 3. The implementation principles and technical effects thereof are similar, and are not repeated herein.

Further, based on the embodiment shown in FIG. 6, in Embodiment 4 of the control unit according to the present invention, whether offload processing needs to be performed for the UE is determined specifically on the basis of comparing residual capacities of networks of standards. The processing module 62 is specifically configured to:

determine a residual capacity of the first-standard network according to the first resource status information; and if determining, according to the second resource status information, that a residual capacity of a first network in the at least one second-standard network is greater than the residual capacity of the first-standard network, offload the UE to the first network.

Specifically, if the residual capacity of the first network in the at least one second-standard network is greater than the residual capacity of the first-standard network, the first network may provide a more efficient service for the UE, and offloading the UE to the first network may meet requirements of a user on radio resources better.

Understandably, if determining, according to the second resource status information, that a residual capacity of a network in the at least one second-standard network is greater than the residual capacity of the first-standard network, the control unit offloads the UE to the network whose residual capacity is greater than the residual capacity of the first-standard network, in the at least one second-standard network, so that the requirements of the user on radio resources may be met better.

The apparatus provided by this embodiment may be used for executing the technical solution of the method embodiment shown in FIG. 4. The implementation principles and technical effects thereof are similar, and are not repeated herein.

Further, based on Embodiment 4 of the control unit according to the present invention, in Embodiment 5 of the control unit according to the present invention, in a scenario where in at least one second-standard network, there are two or more networks whose residual capacity is greater than a residual capacity of a first-standard network, an offload processing method using service type information of a UE as a selection basis is provided. The processing module 62 is further configured to:

if there are two or more first networks in the at least one second-standard network, acquire service type information of a service required by the UE; and offload the UE to a first network meeting the service type information.

Optionally, the service type information of the UE includes any one or a combination of browse, interaction, and download.

Specifically, if there are two or more first networks in the at least one second-standard network, the control unit needs to select to offload the UE to one network in the at least two first networks, and the control unit may select one network in the at least two first networks according to the service type information of the service required by the UE. For example, if the service type information of the UE is download, the residual capacity required by the UE is large, and the UE is offloaded to one network having a large residual capacity, in the at least two first networks.

Understandably, in some scenarios, the service type information of the UE may also be used as a basis for determining whether to perform offload processing for the UE. For example, the residual capacity of the first-standard network in which the UE is located is less than the residual capacity of the first network in the at least one second-standard network, but the current service type information of the UE is interaction, the required residual capacity is small, and the residual capacity of the first-standard network can meet the requirement of the UE for performing normal interaction; in this case, offload processing may not be performed for the UE, and the first-standard network still provides a service for the UE.

The apparatus provided by this embodiment may be used for executing the technical solution of the method embodiment shown in FIG. 5. The implementation principles and technical effects thereof are similar, and are not repeated herein.

Figure 7:
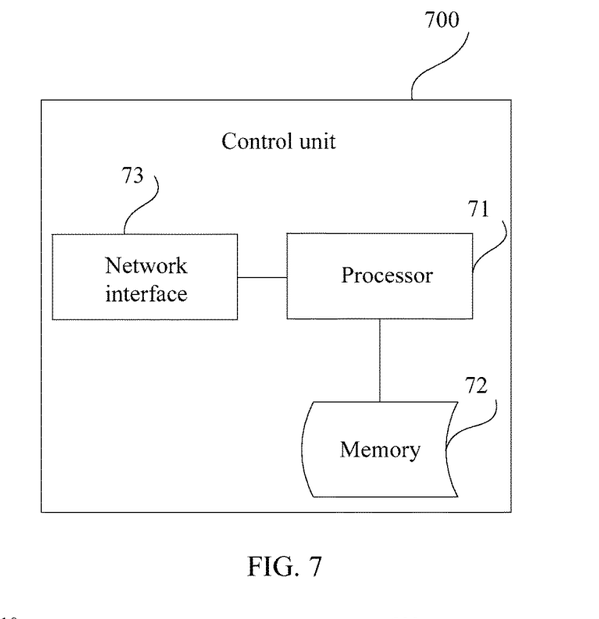
FIG. 7 is a schematic structural diagram of Embodiment 6 of a control unit according to the present invention.

FIG. 7 is a schematic structural diagram of Embodiment 6 of a control unit according to the present invention. As shown in FIG. 7, a control unit 700 provided by this embodiment includes a processor 71, a memory 72, and a network interface 73. The memory 72 stores an execution instruction; when the control unit 700 runs, the processor 71 communicates with the memory 72; the processor 71 is connected to the network interface 73; the network interface 73 includes a network interface for communication with a WiFi network and other networks than the WiFi network; and the processor 71 executes the execution instruction, so that the control unit 700 executes the following operations:

after a UE accesses a first-standard network, acquiring first resource status information of the first-standard network and second resource status information of at least one second-standard network having an overlapping area with the first-standard network, where the first-standard network or the second-standard network includes a WiFi network; and determining, according to the first resource status information and the second resource status information, whether offload processing needs to be performed for the UE.

Optionally, the acquiring second resource status information of at least one second-standard network having an overlapping area with the first-standard network, includes:

determining, by the processor 71, a location of the UE; and acquiring, by the network interface 73, second resource status information of at least one second-standard network, which has an overlapping area with the first-standard network, at the location of the UE.

Optionally, the acquiring second resource status information of at least one second-standard network having an overlapping area with the first-standard network, includes:

determining, by the processor 71, a network support capability of the UE; and acquiring, by the network interface 73, second resource status information of at least one second-standard network having an overlapping area with the first-standard network and supported by the network support capability of the UE.

Optionally, the determining, according to the first resource status information and the second resource status information, whether offload processing needs to be performed for the UE, includes:

determining, by the processor 71, a residual capacity of the first-standard network according to the first resource status information; and if determining, according to the second resource status information, that a residual capacity of a first network in the at least one second-standard network is greater than the residual capacity of the first-standard network, offloading, by the processor 71, the UE to the first network.

Optionally, the offloading the UE to the first network if there are two or more first networks in the at least one second-standard network, includes:

acquiring, by the processor 71, service type information of a service required by the UE; and offloading, by the processor 71, the UE to a first network meeting the service type information.

Optionally, the service type information of the UE includes any one or a combination of browse, interaction, and download.

Optionally, the acquiring first resource status information of the first-standard network and second resource status information of at least one second-standard network having an overlapping area with the first-standard network, includes:

querying and acquiring, by the network interface 73, resource status information of the WiFi network from a controller of the WiFi network.

Optionally, the resource status information includes:

at least one piece of information in network deployment information, load information, the number of users, and average bandwidth that each user can acquire.

Optionally, the first-standard network and the second-standard network may be a global system for mobile communications GSM network, a universal mobile telecommunications system UMTS network, a long time evolution LTE network, and a WiFi network, and the first-standard network and the second-standard network are different.

The control unit 700 provided by this embodiment may be used for executing the technical solution of the foregoing method embodiments. The implementation principles and technical effects thereof are similar, and are not repeated herein.

It should be noted that the corresponding schematic diagram of each embodiment is merely exemplary, and that a connection relationship between the parts or modules is not limited to a form shown in the figure, and may be subject to an actual application.

An embodiment of the present invention provides a computer readable medium, including a computer execution instruction, where the computer execution instruction is used to cause a control unit to execute the foregoing method.

The offload processing method according to the present invention is hereinafter described in detail based on a system including any one of the control units in the control unit embodiments and network elements in a GSM network, a UMTS network, an LTE network, and a WiFi network.

Figure 8:
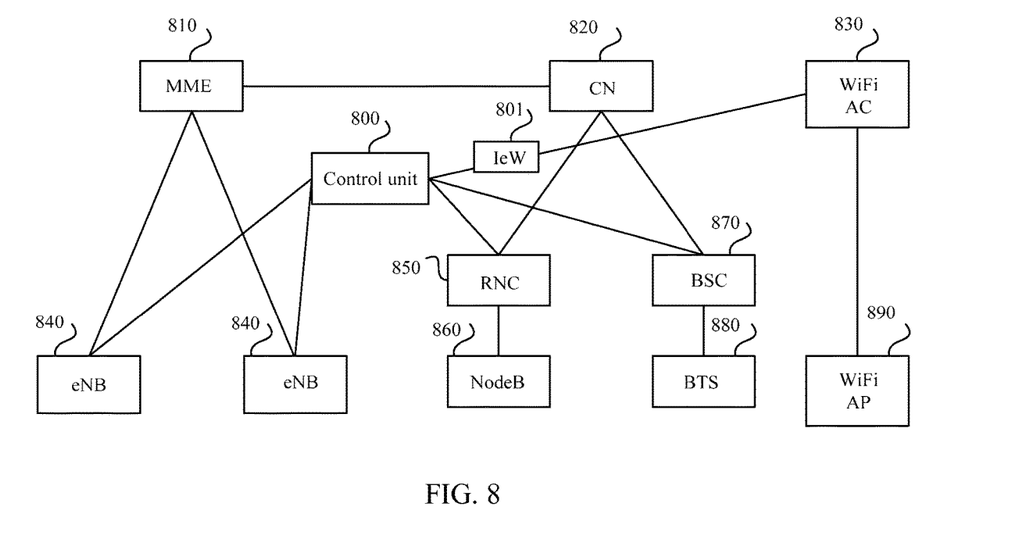
FIG. 8 is a schematic diagram of Embodiment 1 of a system according to the present invention.

FIG. 8 is a schematic diagram of Embodiment 1 of a system according to the present invention. As shown in FIG. 8, in this embodiment, a system including a controller BSC of a GSM network, a controller RNC of a UMTS network, a controller eNB of an LTE network, and a controller WiFi AC of a WiFi network is used as an example. The system provided by this embodiment may include any one of control units 800 according to the control unit embodiments of the present invention and network elements in the GSM network, the UMTS network, the LTE network, and the WiFi network. The system includes a mobility management entity (Mobility Management Entity, MME for short) 810, a core network (Core Network, CN for short) 820, a WiFi AC 830, an eNB 840, an RNC 850, a NodeB 860, a BSC 870, a base transceiver station (Base Transceiver Station, BTS for short) 880, and a WiFi access point (WiFi Access Point, WiFi AP for short) 890. The control unit 800 may acquire resource status information of networks of standards through network interfaces between the control unit 800 and the BSC 870 in the GSM network, between the control unit 800 and the eNB 840 in the LTE network, between the control unit 800 and the RNC 850 in the UMTS network, and between the control unit 800 and the WiFi AC 830 in the WiFi network, and store the resource status information of the network of each standard to the control unit. The network interface between the control unit 800 and the WiFi AC 830 in the WiFi network may be a bidirectional interface for bearing the resource status information of the WiFi network and control indication information of the control unit 800 for the WiFi network, which is a new interface defined for introducing the WiFi network into an existing system; and the interface may be a hardware interface, and may also be a software interface. After a UE accesses a first-standard network, first resource status information of the first-standard network and second resource status information of at least one second-standard network having an overlapping area with the first-standard network are read, and then whether offload processing needs to be performed for the UE is determined according to the first resource status information and the second resource status information.

In the system provided by this embodiment, a control unit acquires resource status information of a network of each standards, and stores the resource status information of the network of each standard to the control unit; after a UE accesses a first-standard network, the control unit reads first resource status information of the first-standard network and second resource status information of at least one second-standard network having an overlapping area with the first-standard network, where the first-standard network or the second-standard network includes a WiFi network; and then, the control unit determines, according to the first resource status information and the second resource status information, whether offload processing needs to be performed for the UE. In this way, a user can be provided with more wireless network resources, the configuration of wireless network resources can be optimized, and further, utilization of wireless network resources can be improved.

Persons of ordinary skill in the art may understand that, all or a part of the steps of the foregoing method embodiments may be implemented by a program instructing relevant hardware. The foregoing program may be stored in a computer readable storage medium. When the program runs, the steps of the foregoing method embodiments are performed. The foregoing storage medium includes any medium capable of storing program code, such as a ROM, a RAM, a magnetic disk, or an optical disc.

Finally, it should be noted that the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments or make equivalent replacements to some or all the technical features thereof, as long as such modifications or replacements do not cause the essence of corresponding technical solutions to depart from the scope of the technical solutions of the embodiments of the present invention.

What is claimed is:

1. An offload processing method comprising:
after a user equipment (UE) accesses a first-standard network, acquiring, by a controller, first resource status information describing resources of the first-standard network for providing data processing services and second resource status information describing resources of two or more second-standard networks for providing data processing services, where the first and second-standard networks have overlapping service areas;
determining, by the controller, a residual capacity of a serving cell of the first-standard network for providing data processing services according to the first resource status information and residual capacities of overlapping serving cells of the two or more second-standard network for providing data processing services according to the second resource status information;
acquiring service type information of a data processing service required by the UE, wherein the service type information includes information of different types of possible services required by the UE, including a browsing service;
selecting one of the second-standard networks based on the acquired service type information; and
offloading, by the controller, traffic of the UE to the selected one of the second-standard networks when (a) the residual capacity of the selected second-standard network is determined from the second resource status information to be greater than the residual capacity of the first-standard network and (b) the residual capacity of the first-standard network does not meet performance requirements for the data processing service required by the UE that is identified by the acquired service type information.

2. The method according to claim 1, wherein the acquiring the second resource status information comprises:
determining, by the controller, a location of the UE; and
acquiring, by the controller, the second resource status information that is associated with the location of the UE of the at least one second-standard network.

3. The method according to claim 1, wherein the acquiring the second resource status information comprises:
determining, by the controller, a network support capability of the UE; and
acquiring, by the controller, the second resource status information supported by the UE according to the network support capability of the UE.

4. The method according to claim 1, wherein acquiring the first resource status information comprises:
querying, by the controller, resource status information of a WiFi network from a controller of the WiFi network.

5. The method according to claim 1, wherein the resource status information comprises at least one piece of information in network deployment information, load information, a quantity of users, and average bandwidth that each user can acquire.

6. The method according to claim 1, wherein the first-standard network and the second-standard network are any different two systems of a global system for mobile communications (GSM) network, a universal mobile telecommunications system (UMTS) network, a long time evolution (LTE) network, and a Wi-Fi network.

7. A controller comprising at least one processor, a non-transitory computer readable memory, and a network interface, wherein the memory stores an execution instruction that when executed by the processor cause the processor to communicate with the network interface, and the network interface to communicate with a first-standard network and a second-standard network, wherein the at least one processor is configured to
acquire, after a user equipment (UE) accesses the first-standard network, first resource status information describing resources of the first-standard network for providing data processing services and second resource status information describing resources of two or more second-standard network overlapping service areas;
determine a residual capacity of a serving cell of the first-standard network for providing data processing services according to the first resource status information and residual capacities of overlapping serving cells of the two or more second-standard network for providing data processing services according to the second resource status information;
acquiring service type information of a data processing service required by the UE, wherein the service type information includes information of different types of possible services required by the UE, including a browsing service;
selecting one of the second-standard networks based on the acquired service type information; and
offloading, by the controller, traffic of the UE to the selected one of the second-standard networks when (a) the residual capacity of the selected second-standard network is determined from the second resource status information to be greater than the residual capacity of the first-standard network and (b) the residual capacity of the first-standard network does not meet performance requirements for the data processing service required by the UE that is identified by the acquired service type information.

8. The controller according to claim 7, wherein the at least one processor is further configured to determine a location of the UE and acquire the second resource status information that is associated with the location of the UE of the at least one second-standard network.

9. The controller control unit according to claim 7, wherein the at least one processor is further configured to determine a network support capability of the UE and acquire the second resource status information supported by the UE according to the network support capability of the UE.

10. The controller according to claim 7, wherein the at least one processor is further configured to query and acquire resource status information of a WiFi network from a controller of the WiFi network.

11. The controller according to claim 7, wherein the resource status information comprises at least one piece of information in network deployment information, load information, a quantity of users, and average bandwidth that each user can acquire.

12. The controller according to claim 7, wherein the first-standard network and the second-standard network are any different two systems of: a global system for mobile communications (GSM) network, a universal mobile telecommunications system (UMTS) network, a long time evolution (LTE) network, and a Wi-Fi network.

13. A non-transitory computer readable medium, comprising a computer execution instruction, wherein the computer execution instruction causes a controller to execute the following:

after a user equipment (UE) accesses a first-standard network, acquiring, first resource status information describing resources of the first-standard network for providing data processing services and second resource status information describing resources of two or more second-standard networks for providing data processing services, where the first and second-standard networks have overlapping service areas;

determine a residual capacity of a serving cell of the first-standard network for providing data processing services according to the first resource status information and residual capacities of overlapping serving cells of the two or more second-standard network for providing data processing services according to the second resource status information;

acquiring service type information of a data processing service required by the UE, wherein the service type information includes information of different types of possible services required by the UE, including a browsing service;

selecting one of the second-standard networks based on the acquired service type information; and offloading traffic of the UE to the selected one of the second-standard networks when (a) the residual capacity of the selected second-standard network is determined from the second resource status information to be greater than the residual capacity of the first-standard network and (b) the residual capacity of the first-standard network does not meet performance requirements for the data processing service required by the UE that is identified by the acquired service type information.

14. The non-transitory computer readable medium of claim 13 includes computer execution instruction for execution by the controller, causing the controller to querying resource status information of a WiFi network from a controller of the WiFi network.

15. The non-transitory computer readable medium of claim 13, wherein the resource status information comprises at least one piece of information in network deployment information, load information, a quantity of users, and average bandwidth that each user can acquire.

16. The non-transitory computer readable medium of claim 13, wherein the first-standard network and the second-standard network are any two different systems of (a) a global system for mobile communications (GSM) network, (b) a universal mobile telecommunications system (UMTS) network, (c) a long time evolution (LTE) network, and (d) a Wi-Fi network.

17. A system comprising a first controller having at least one processor, a non-transitory memory, and a network interface, wherein the memory stores an execution instruction that when executed by the processor configures the processor to:

acquire, after a user equipment (UE) accesses a first-standard network, first resource status information describing resources of the first-standard network for providing data processing services and second resource status information describing resources of two or more second-standard network for providing data processing services overlapping service areas;

determine a residual capacity of a serving call of the first-standard network for providing data processing services according to the first resource status information and residual capacities of overlapping serving cells of the two or more second-standard network for providing data processing services according to the second resource status information;

acquiring service type information of a data processing service required by the UE, wherein the service type information includes information of different types of possible services required by the UE, including a browsing service;

selecting one of the second-standard networks based on the acquired service type information; and offloading traffic of the UE to the selected one of the second-standard networks when (a) the residual capacity of the selected second-standard network is determined from the second resource status information to be greater than the residual capacity of the first-standard network and (b) the residual capacity of the first-standard network does not meet performance requirements for the data processing service required by the UE that is identified by the acquired service type information;

other controllers of other networks, wherein each other controller communicates with the first controller through the network interface.

18. The system of claim 17 wherein the processor is further configured to query and acquire resource status information of a WiFi network from a controller of the WiFi network.

19. The system of claim 17, wherein the resource status information comprises at least one piece of information in network deployment information, load information, a quantity of users, and average bandwidth that each user can acquire.

20. The system of claim 17, wherein the first-standard network and the second-standard network are any two different systems of (a) a global system for mobile communications (GSM) network, (b) a universal mobile telecommunications system (UMTS) network, (c) a long time evolution (LTE) network, and (d) a Wi-Fi network.

* * * * *